US011368594B2

(12) United States Patent
Urase et al.

(10) Patent No.: US 11,368,594 B2
(45) Date of Patent: Jun. 21, 2022

(54) IMAGE READING APPARATUS, IMAGE FORMING APPARATUS, AND METHOD OF CONTROLLING IMAGE READING APPARATUS

(71) Applicant: KYOCERA Document Solutions Inc., Osaka (JP)

(72) Inventors: Shota Urase, Osaka (JP); Ryota Maeda, Osaka (JP); Taro Kurahashi, Osaka (JP); Koji Fujii, Osaka (JP); Masahiro Nakao, Osaka (JP); Takuro Murata, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/468,202

(22) Filed: Sep. 7, 2021

(65) Prior Publication Data
US 2022/0086295 A1 Mar. 17, 2022

(30) Foreign Application Priority Data

Sep. 11, 2020 (JP) .............................. JP2020-152651

(51) Int. Cl.
*G06F 3/13* (2006.01)
*H04N 1/00* (2006.01)

(52) U.S. Cl.
CPC ..... *H04N 1/00649* (2013.01); *H04N 1/00037* (2013.01); *H04N 1/00084* (2013.01); *H04N 1/00087* (2013.01); *H04N 1/00588* (2013.01); *H04N 1/00785* (2013.01); *H04N 2201/0094* (2013.01)

(58) Field of Classification Search
CPC ........... H04N 1/00649; H04N 1/00037; H04N 1/00087; H04N 1/00588; H04N 1/00785; H04N 2201/0094
See application file for complete search history.

(56) References Cited

U.S. PATENT DOCUMENTS

| 2006/0012837 A1* | 1/2006 | Ishikawa | H04N 1/32667 358/474 |
| 2011/0135325 A1* | 6/2011 | Hitaka | G03G 15/2039 399/21 |
| 2018/0160008 A1* | 6/2018 | Osada | H04N 1/00708 |
| 2018/0183968 A1* | 6/2018 | Furukawa | H04N 1/00013 |

FOREIGN PATENT DOCUMENTS

JP    JR 2006-33325 A    2/2006

* cited by examiner

*Primary Examiner* — Moustapha Diaby
(74) *Attorney, Agent, or Firm* — Stein IP, LLC

(57) ABSTRACT

Conveyance modes include a registration mode accompanied with skew correction and a registrationless mode unaccompanied with skew correction. When a jam occurs, the controller interrupts a job, and invokes blank-feed processing starting from a state with all sheets re-set. On invoking blank-feed processing, the controller checks the conveyance mode and recognizes the number of jams. If the conveyance mode is the registration mode and in addition the number of jams has not reached a threshold number of jams, the controller invokes blank-feed processing in the registrationless mode.

8 Claims, 5 Drawing Sheets

IMAGE READING APPARATUS, IMAGE FORMING APPARATUS, AND METHOD OF CONTROLLING IMAGE READING APPARATUS

INCORPORATION BY REFERENCE

This application is based upon and claims the benefit of priority from the corresponding Japanese Patent Application No. 2020-152651 filed on Sep. 11, 2020, the contents of which are hereby incorporated by reference.

BACKGROUND

The present disclosure relates to an image reading apparatus, an image forming apparatus, and a method of controlling an image reading apparatus.

Image reading apparatuses that convey sheets and read the sheets being conveyed are known.

On a known image reading apparatus, when a jam occurs during execution of a job that involves reading a plurality of sheets, the job is interrupted and the user is prompted to re-set all the sheets including those that have finished being read. On the known image reading apparatus, starting from a state where all the sheets have been re-set, the interrupted job is restarted. On such an occasion, on the known image reading apparatus, blank-feed processing (skipping of sheets) is performed to convey as many sheets as have finished being read without reading them. Moreover, on the known image reading apparatus, the sheet conveying speed during blank-feed processing is made higher than that during ordinary processing.

SUMMARY

According to a first aspect of the present disclosure, an image reading apparatus includes a conveying portion, a reading portion, and a controller. The conveying portion has a conveyance passage leading from a setting portion via a registration position and a reading position to a discharge portion, and during execution of a job the conveying portion feeds a sheet set on the setting portion to the conveyance passage, then conveys the sheet, and then discharges the sheet to the discharge portion. During execution of the job the reading portion reads at the reading position the sheet being conveyed along the conveyance passage. The controller controls the job. The conveying portion has, as sheet conveyance modes, a registration mode in which the conveying portion performs skew correction for the sheet at the registration position and a registrationless mode in which the conveying portion does not perform the skew correction. When a jam occurs during execution of the job, the controller interrupts the job: the controller sets as a recovery number of sheets the number of sheets that have finished being read by the reading portion; the controller makes the conveying portion perform blank-feed processing to discharge a sheet fed to the conveyance passage to the discharge portion without reading it starting from a state where all the sheets that were set on the setting portion at the start of the job have been re-set on the setting portion until the number of sheets that have fed from the setting portion to the conveyance passage reaches the recovery number of sheets; and the controller makes the reading portion read a sheet starting with the next sheet that is fed to the conveyance passage after feeding of a number of sheets corresponding to the recovery number of sheets to the conveyance passage. When making the conveying portion perform the blank-feed processing, the controller checks whether or not the conveyance mode before interruption of the job was the registration mode and if the conveyance mode before interruption of the job was the registration mode, the controller recognizes the number of jams that have occurred in the job. If the conveyance mode before interruption of the job was the registration mode and in addition the number of jams has not reached a prescribed threshold number of jams, the controller makes the conveying portion perform the blank-feed processing in the registrationless mode.

According to a second aspect of the present disclosure, an image forming apparatus includes an image reading apparatus as described above.

According to a third aspect of the present disclosure, a method of controlling an image reading apparatus is one for an image reading apparatus that has a conveyance passage leading from a setting portion via a registration position and a reading position to a discharge portion, that during execution of a job feeds a sheet set on the setting portion to the conveyance passage and then conveys the sheet, that reads at the reading position the sheet being conveyed along the conveyance passage, and that discharges the sheet to the discharge portion, wherein sheet conveyance modes include a registration mode in which skew correction for the sheet is performed at the registration position and a registrationless mode in which the skew correction is not performed. The method includes: when a jam occurs during execution of the job, interrupting interrupts the job, setting as a recovery number of sheets the number of sheets that have finished being read by the reading portion, performing blank-feed processing to discharge a sheet fed to the conveyance passage to the discharge portion without reading it starting from a state where all the sheets that were set on the setting portion at the start of the job have been re-set on the setting portion until the number of sheets that have fed from the setting portion to the conveyance passage reaches the recovery number of sheets, and reading a sheet starting with the next sheet that is fed to the conveyance passage after feeding of a number of sheets corresponding to the recovery number of sheets to the conveyance passage; when performing the blank-teed processing, checking whether or not the conveyance mode before interruption of the job was the registration mode and if the conveyance mode before interruption of the job was the registration mode, recognizing the number of jams that have occurred in the job; and if the conveyance mode before interruption of the job was the registration mode and in addition the number of jams has not reached a prescribed threshold number of jams, performing the blank-feed processing in the registrationless mode.

According to a fourth aspect of the present disclosure, an image reading apparatus includes a conveying portion, a reading portion, and a controller. The conveying portion having a conveyance passage leading from a setting portion via a registration position and a reading position to a discharge portion, and during execution of a job the conveying portion feeds a sheet set on the setting portion to the conveyance passage, then conveys the sheet, and then discharges the sheet to the discharge portion. During execution of the job the reading portion reads at the reading position the sheet being conveyed along the conveyance passage. The controller controls the job. The conveying portion has, as sheet conveyance modes, a registration mode in which the conveying portion momentarily stops the sheet at the registration position and a registrationless mode in which the conveying portion does not momentarily stop the sheet. When a jam occurs during execution of the job, the controller interrupts the job; the controller sets as a recovery number of sheets the number of sheets that have finished being read by the reading portion; the controller makes the conveying portion perform blank-feed processing to discharge a sheet fed to the conveyance passage to the discharge portion without reading it starting from a state where all sheets that were set on the setting portion at the start of the job have been re-set on the setting portion until a number of sheets that have fed from the setting portion to the conveyance passage reaches the recovery number of sheets. When making the conveying portion perform the blank-feed processing, the controller makes the conveying portion perform the blank-feed processing in the registrationless mode.

DETAILED DESCRIPTION

An embodiment of the present disclosure will be described below, taking a multifunction peripheral as an example.

Figure 1:
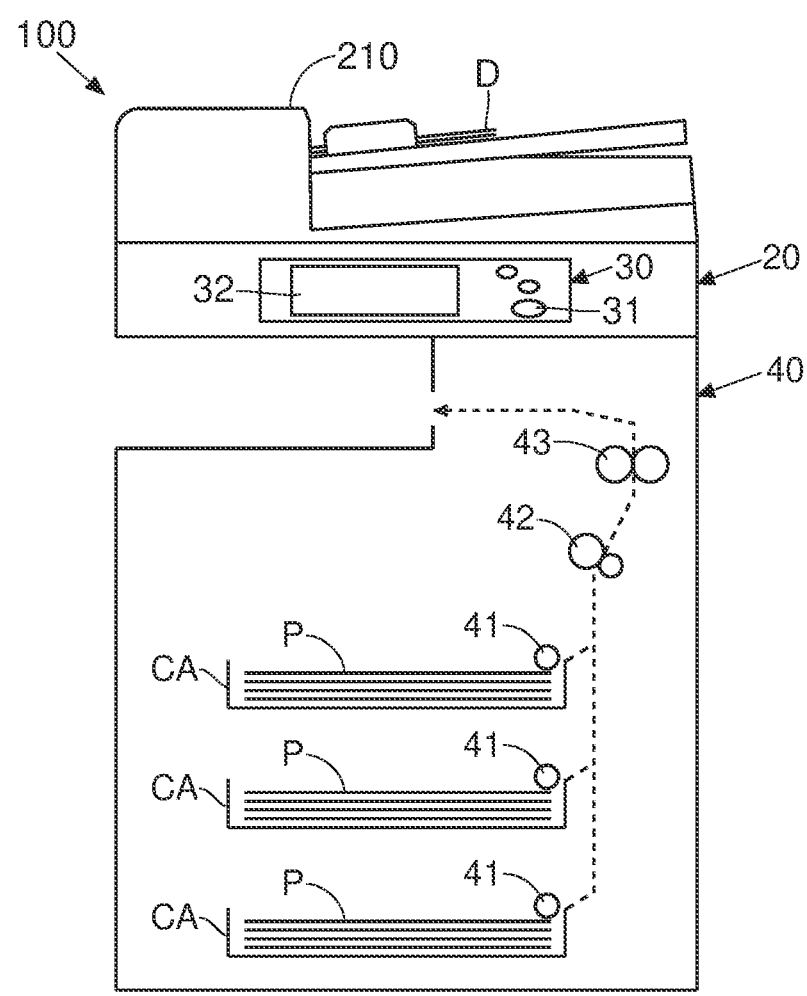
FIG. 1 is a schematic diagram of a multifunction peripheral according to an embodiment of the present disclosure.

Construction of a Multifunction Peripheral: As shown in FIG. 1, the multifunction peripheral 100 according to the embodiment is provided with a scanner 20 including a document conveying unit 210. The multifunction peripheral 100 corresponds to an "image forming apparatus". The scanner 20 including the document conveying unit 210 corresponds to an "image reading apparatus". The document conveying unit 210 corresponds to a "conveying portion".

Figure 2:
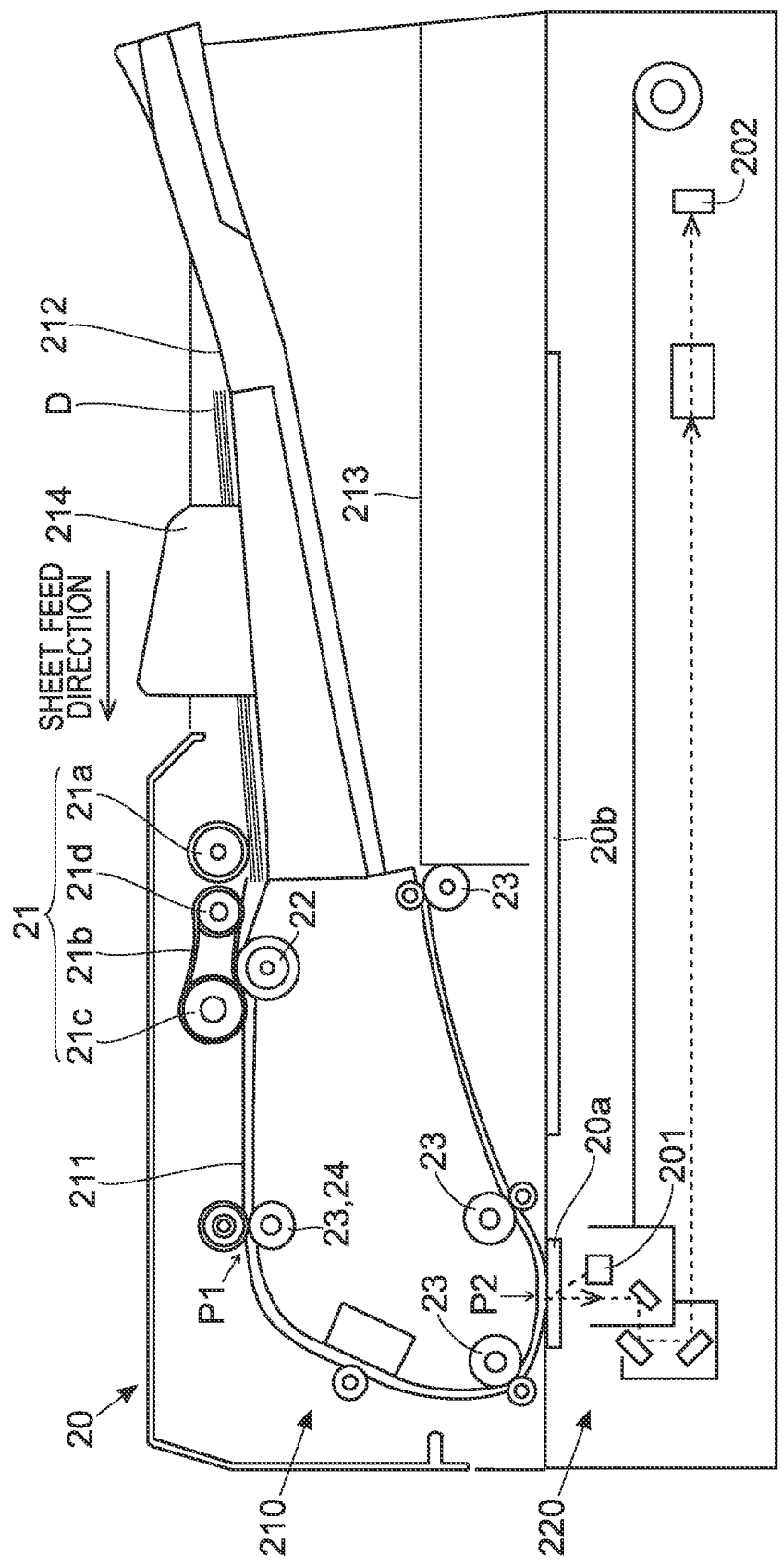
FIG. 2 is a schematic diagram of a scanner provided in the multifunction peripheral according to the embodiment of the present disclosure.

The scanner 20 has a construction as shown in FIG. 2. The scanner 20 reads a document D. The document D corresponds to a "sheet". The scanner 20 has as its reading modes a feed-reading mode and a placed-reading mode.

The scanner 20 has a feed-reading contact glass 20a and a placed-reading contact glass 20b. In the teed-reading mode, the scanner 20 reads a document D that is conveyed to the feed-reading contact glass 20a and passes across the top surface of the feed-reading contact glass 20a. In the placed-reading mode, the scanner 20 reads a document D placed on the top surface of the placed-reading contact glass 20b.

The scanner 20 includes a reading portion 220. The reading portion 220 reads the document D. The reading portion 220 includes a light source 201 and an image sensor 202. The light source 201 shines light to the document D as the reading target. The image sensor 202 receives the light reflected from the document D and performs photoelectric conversion. In the feed-reading mode, the light source 201 is held at the position shown in FIG. 2, and from this position the light source 201 shines light toward the feed-reading contact glass 20a. The light is reflected from the document D on the feed-reading contact glass 20a, and the light reflected from the document D strikes the image sensor 202. Thus a document D being conveyed along a conveyance passage 211 is read. In the feed-reading mode, light travels as indicated by broken-line arrows in FIG. 2.

The light source 201 and the image sensor 202 are provided inside a reading housing. The contact glasses 20a and 20b are fitted in a top surface part of the reading housing. The document conveying unit 210 is mounted so as to be pivotable with respect to the reading housing. The document conveying unit 210 is pivotable in directions in which it exposes and covers the top surface of the reading housing (i.e., the top surfaces of the contact glasses 20a and 20b respectively). FIG. 2 shows a state where the document conveying unit 210 covers the top surface of the reading housing. In the feed-reading mode, a document D is read in the state shown in FIG. 2.

The document conveying unit 210 has a conveyance passage 211. The document conveying unit 210 includes a set tray 212. The set tray 212 corresponds to a "setting portion". The document conveying unit 210 also includes a discharge tray 213. The discharge tray 213 corresponds to a "discharge portion". The conveyance passage 211 leads from the set tray 212 via a registration position P1 and a reading position P2 in this order to the discharge tray 213.

In the feed-reading mode, a document D as the reading target is set on the set tray 212. The document conveying unit 210 feeds the document D from the set tray 212 into the conveyance passage 211 and conveys it along the conveyance passage 211. The document D passes the registration position P1 and the reading position P2 in this order. When the document D passes the reading position P2, the reading portion 220 reads the document D at the reading position P2. After being read, the document D is discharged onto the discharge tray 213.

The set tray 212 includes a pair of guides 214. The pair of guides 214 abuts the document D set on the set tray 212 from opposite sides in the width direction of the document D orthogonal to its feed direction (conveyance direction), and thereby restricts the movement of the document D set on the set tray 212 in the width direction. The pair of guides 214 is a member for positioning the document D set on the set tray 212 in the width direction.

The pair of guides 214 is slidable in the width direction. The pair of guides 214 slides in the width direction in a coordinated manner: sliding one guide 214 causes the other guide 214 to slide. Here the pair of guides 214 slides in opposite directions; that is, the pair of guides 214 slides in such directions as to move closer to or away from each other.

When setting a document D on the set tray 212, the user adjusts the interval between the pair of guides 214 in the width direction (the interval from one guide 214 to the other guide 214 in the width direction) to the dimension of the document D in the width direction. As a result, with the document D set on the set tray 212, of the four sides of the document D, the pair of sides parallel to the feed direction makes contact with the guides 214. Thus the document D is positioned in the width direction. With the document D positioned by the pair of guides 214, the middle of the conveyance passage 211 in the width direction and the middle of the document D in the width direction substantially coincide.

The document conveying unit 210 includes a sheet feed portion 21. The sheet feed portion 21 includes a rotary member. By rotating the rotary member, the sheet feed portion 21 feeds the document D set on the set tray 212 to the conveyance passage 211.

The sheet feed portion 21 includes a sheet feed roller 21a and a sheet feed belt 21b. The sheet feed roller 21a pulls the document D out of the set tray 212. The sheet feed belt 21b feeds the document D pulled out of the set tray 212 to the conveyance passage 211. The sheet feed belt 21b is stretched around a driving roller 21c and a driven roller 21d. As the driving roller 21c rotates, the sheet teed belt 21b moves around.

At a position opposite the sheet feed belt 21b across the conveyance passage 211, a separation roller 22 is provided. The separation roller 22 rotates such that the document D travels in the direction opposite to the sheet feed direction. Thus, even when a plurality of documents D overlapping with each other are pulled out of the set tray 212, they are separated into one sheet followed by the next. Thus, at a time, only the document D in contact with the sheet feed belt 21b (i.e., the topmost document D) is fed into the conveyance passage 211.

At a plurality of places along the conveyance passage 211, pairs of conveying rollers 23 are provided respectively. The plurality of pairs of conveying rollers 23 each rotate to convey the document D that has entered their respective nips (each between a pair of rollers).

One of the plurality of pairs of conveying rollers 23 is a pair of registration rollers 24. The pair of registration rollers 24 is provided along the conveyance passage 211, at a position downstream of where the sheet feed portion 21 is provided in the conveyance direction. The position where the pair of registration rollers 24 is provided is the registration position P1. The registration position P1 is a position upstream of the reading position P2 in the conveyance direction, and is the most upstream of the positions where the pairs of conveying rollers 23 are provided. The operation of the pair of registration rollers 24 will be described later.

As shown back in FIG. 1, the multifunction peripheral 100 includes an operation panel 30. The operation panel 30 corresponds to an "accepting portion". The operation panel 30 is provided on the housing of the scanner 20.

The operation panel 30 includes a plurality of hardware buttons including a Start button 31. The Start button 31 is a button for accepting from a user an instruction to start execution of a job (e.g., a copy job) involving reading of a document D by the scanner 20.

The operation panel 30 also includes a touch screen 32. The touch screen 32 displays software buttons, messages, and the like, and accepts touch operations from the user. For example, settings related to a job using the scanner 20 are made via the touch screen 32.

The multifunction peripheral 100 includes a printing portion 40. The printing portion 40 conveys a sheet P along a sheet conveyance passage (indicated by a broken-line arrow in FIG. 1). The printing portion 40 forms an image. The printing portion 40 prints the image on the sheet P being conveyed. In a copy job, the scanner 20 reads the document D. The printing portion 40 prints the image on the sheet P based on the image data acquired by reading the document D.

The printing portion 40 includes a sheet feed roller 41. The sheet feed roller 41 feeds a sheet P from a sheet cassette CA into the sheet conveyance passage, The printing portion 40 includes a pair of transfer rollers 42. The pair of transfer rollers 42 includes a photosensitive drum and a transfer roller. The photosensitive drum carries a toner image on its circumferential surface. The transfer roller is kept in pressed contact with the photosensitive drum to form a transfer nip between them. The pair of transfer rollers 42 rotates and, while conveying the sheet P that has entered the transfer nip, transfers the toner image to the sheet P.

The printing portion 40 further includes, though not illustrated, a charging device, an exposure device, and a developing device. The charging device electrostatically charges the circumferential surface of the photosensitive drum. The exposure device forms an electrostatic latent image on the circumferential surface of the photosensitive drum. The developing device develops the electrostatic latent image on the circumferential surface of the photosensitive drum into a toner image.

The printing portion 40 includes a pair of fixing rollers 43. The pair of fixing rollers 43 includes a heating roller and a pressing roller. The heating roller incorporates a heater (not illustrated). The pressing roller is kept in pressed contact with the heating roller to form a fixing nip between them. The pair of fixing rollers 43 rotates and, while conveying the sheet P that has entered the fixing nip, fixes the toner image transferred to the sheet P to the sheet P.

Figure 3:
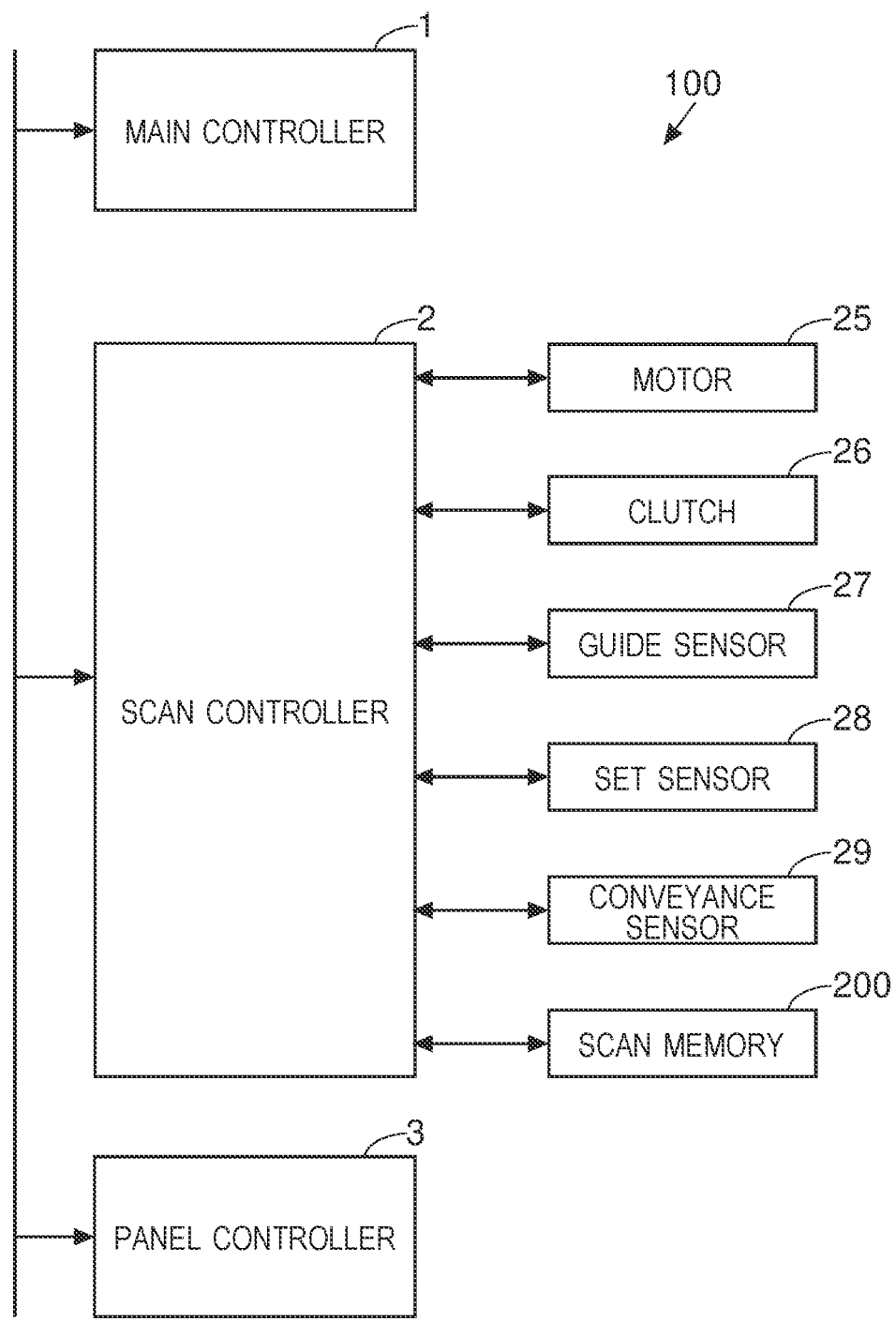
FIG. 3 is a block diagram of the multifunction peripheral according to the embodiment of the present disclosure.

As shown in FIG. 3, the multifunction peripheral 100 includes a main controller 1. The main controller 1 includes a CPU and a memory. The main controller 1 controls the entire multifunction peripheral 100. The main controller 1 also controls printing by the printing portion 40.

The multifunction peripheral 100 includes a scan controller 2. The scan controller 2 corresponds to a "controller". The scan controller 2 includes a CPU. The scan controller 2 controls reading of a document D by the scanner 20. The scan controller 2 is connected to a scan memory 200. The scan memory 200 includes a memory. The scan controller 2 reads data from the scan memory 200. The scan controller 2 also writes data to the scan memory 200.

The scan controller 2 controls feeding and conveying of the document D by the document conveying unit 210. Specifically, the scan controller 2 controls motors 25 that rotate different rotary members involved in the feeding and conveying of the document D. The scan controller 2 also turns on and off clutches 26 that couple the motors 25 to the rotary members. By turning on and off the clutches 26, the scan controller 2 couples and decouples the motors 25 to and from the rotary members. When decoupled from the motors 25, the rotary members are free to rotate.

For example, the sheet feed portion 21 and the separation roller 22 rotate by receiving a driving force from the same motor 25 (sheet feed motor 25). The pair of registration rollers 24 rotates by receiving a driving force from a separate motor 25 (registration motor 25) dedicated to it. The other pairs of conveying rollers 23 rotate by receiving a driving force from another separate motor 25 (conveyance motor) different from either of the sheet feed motor 25 and the registration motor 25. Any number of conveyance motors 25 may be provided. The number of conveyance motors 25 provided may be changed to suit the number of pairs of conveying rollers 23 provided and where they are provided.

The scan controller 2 is connected to a guide sensor 27. The guide sensor 27 changes its output value in accordance with the positions of the guides 214 in the width direction. That is, the guide sensor 27 outputs a value that reflects the dimension of the document D set on the set tray 212 in the width direction. Based on the output value of the guide sensor 27, the scan controller 2 recognizes the dimension of the document D set on the set tray 212 in the width direction.

The scan controller 2 is connected to a set sensor 28. The set sensor 28 changes its output value in accordance with whether or not a document D is present on the set tray 212. When executing a job involving reading of a document D, the user sets the document D on the set tray 212. Based on the output value of the set sensor 28, the scan controller 2 senses whether or not a document D is present on the set tray 212. Based on the result of the sensing, the scan controller 2 determines whether or not a document D is set on the set tray 212. Based on the result of the sensing, the scan controller 2 also checks whether or not the document D has been removed from the set tray 212.

The scan controller 2 is connected to conveyance sensors 29. The conveyance sensors 29 have their respective sensing positions at predetermined positions along the conveyance passage 211. A plurality of conveyance sensors 29 are provided along the conveyance passage 211. That is, along the conveyance passage 211 are distributed a plurality of sensing positions of the conveyance sensors 29. Based on the output values of those conveyance sensors 29, the scan controller 2 recognizes, with respect to each of the sensing positions, arrival of the front end of a document D and passage of the rear end of a document D. Based on the results of the sensing, the scan controller 2 checks whether or not a document D has jammed in the conveyance passage 211. This will be described in detail later.

The plurality of conveyance sensors 29 change their output values in accordance with whether or not a document D is present at the sensing positions corresponding to them respectively. When the front end of a document D reaches a given sensing position, the output value of the conveyance sensor 29 corresponding to that sensing position changes. Thereafter when the rear end of the document D passes the same sensing position, the output value of the conveyance sensor 29 corresponding to that sensing position changes.

The scan controller 2 communicates with the main controller 1. Based on control signals received from the main controller 1, the scan controller 2 controls the scanner 20 (document conveying unit 210). The scanner 20 may he controlled by the main controller I; that is, the main controller 1 may be configured to function as the "controller".

The multifunction peripheral 100 includes a panel controller 3. The panel controller 3 controls display operation by the operation panel 30. The panel controller 3 also senses operations made on the operation panel 30.

The panel controller 3 communicates with the main controller 1. The panel controller 3 transmits to the main controller 1 operation signals that convey operations made on the operation panel 30. Based on operation signals, the main controller 1 senses the operations made on the operation panel 30. The main controller 1 transmits control signals to the panel controller 3. Based on the control signals from the main controller 1, the panel controller 3 controls the operation panel 30.

Operation signals may be transmitted to the scan controller 2. Control signals may be transmitted from the scan controller 2 to the panel controller 3. The panel controller 3 may be omitted, in which case the scan controller 2 (or the main controller 1) may control the operation panel 30.

Document Conveyance Modes: The document conveying unit 210 has, as conveyance modes for the document D, a registration mode and a registrationless mode. The registration mode is a mode in which skew correction for the document D is performed at the registration position P1. The registrationless mode is a mode in which no skew correction for the document D is performed at the registration position P1.

1. Registration Mode: In the registration mode, the scan controller 2 stops the rotation of the pair of registration rollers 24 and in this state lets the front end of the document D reach the registration position P1. Here, when the front end of the document D has just reached the registration position P1, the sheet feed portion 21 is still rotating. Thus, after the front end of the document D reaches the registration position P1 and strikes the pair of registration rollers 24, the document D is thrust further toward the registration position Pl. Thus a front-end part of the document D sags. In this way, if the document D has been fed skewed, the skew of the document D is corrected.

In the registration mode, the traveling (conveying) of the document D is momentarily stopped, and thereby a skew of the document D is corrected. In the registration mode, while a skew of the document D can be corrected, momentarily stopping the traveling of the document D results in lower productivity.

A skewed document D tends to cause a jam; by contrast, unskewed documents D help suppress jams. In the registration mode, a skew of the document D is corrected and this makes jams less likely.

2. Registrationless Mode: In the registrationless mode, the scan controller 2, while keeping the pair of registration rollers 24 rotating, lets the front end of the document D reach the registration position P1. That is, the pair of registration rollers 24 starts rotating before the document D reaches the registration position P1. Since the front end of the document D reaches the registration position P1 while the pair of registration rollers 24 is rotating, the traveling of the document D is not stopped. Even if the document D is fed skewed, it is conveyed as it is.

In the registrationless mode, the traveling of the document D is not stopped at the registration position P1. Thus the registrationless mode causes no drop in productivity. Productivity is higher here than in the registration mode. However, even if the document D is fed skewed, the skew of the document D cannot be corrected.

3. Setting a Conveyance Mode: The operation panel 30 accepts from the user an instruction to execute a feed-reading job. A feed-reading job is a job that involves reading of the document D in the feed-reading mode.

The operation panel 30 also accepts the user's choice of the type (such as thick or regular sheet) of the document D to be read in the feed-reading job. In other words, the operation panel 30 accepts the user's choice of the type of the document D set on the set tray 212. Choice of the type of the document D is accepted before the start of the feed-reading job.

Each time a document D is set on the set tray 212, the scan controller 2 gives the main controller 1 a notification to the effect that the document D is set on the set tray 212. Based on the notification from the scan controller 2, the main controller 1 determines whether or not a document D is set on the set tray 212. When with a document D set on the set tray 212 the Start button 31 is sensed to be operated, the main controller 1 recognizes that the operation panel 30 has accepted an instruction to execute a feed-reading job, and notifies the scan controller 2 accordingly. Now the scan controller 2 starts the feed-reading job. Thus, when with a document D set on the set tray 212 the Start button 31 is sensed to be operated, the scan controller 2 starts a feed-reading job.

Here, before the start of the feed-reading job, the scan controller 2 recognizes the type of the document D set on the set tray 212. Based on the type of the document D set on the set tray 212, the scan controller 2 sets the conveyance mode of the document conveying unit 210 in the feed-reading job about to be started.

When the operation panel 30 accepts choice of the type of the document D, the main controller 1 notifies the scan controller 2 of the type of the document D set on the set tray

212. Thus, before the start of a feed-reading job, the scan controller 2 has recognized the type of the document D set on the set tray 212.

When the conveyance mode is set, the scan controller 2 takes as the target type the type of the document D to be conveyed in the imminent feed-reading job, and predicts whether or not conveying the document D of the target type in the registrationless mode is likely to increase the likelihood of a jam (i.e., performs prediction processing).

For example, the scan controller 2 includes an IC for machine learning. Through machine learning, the scan controller 2 generates a learned model for prediction processing. Using the learned model, the scan controller 2 performs prediction processing. Learned models for prediction processing may be provided by the manufacturer on a regular basis.

For example, in the scan memory 200 is stored jam information that indicates the number of jams that occurred in feed-reading jobs in the registration mode, the dates of their occurrence, and the like. The jam information is stored separately for different types of documents D. When the conveyance mode is set, the scan controller 2 extracts the jam information associated with the target type, and recognizes the number of jams that occurred during a predetermined period up to then. If the recognized number of jams that occurred is smaller than a predetermined number, the scan controller 2 predicts that jams are unlikely to occur. If the recognized number of jams that occurred is equal to or greater than the predetermined number, the scan controller 2 predicts that jams are likely to occur.

If the prediction processing predicts that jams are unlikely to occur, the scan controller 2 sets the conveyance mode to the registrationless mode. When jams are predicted to be likely, the scan controller 2 sets the conveyance mode to the registration mode.

Prediction processing may be achieved by any procedure. Any other procedure may be used to predict whether or not conveying the document D of the target type in the registrationless mode is likely to increase the likelihood of a jam.

Detecting a Document Jam: On sensing the arrival of the front end of the document D at the sensing position of a given conveyance sensor 29 (here referred to as the first sensor), the scan controller 2 starts counting time. After the arrival of the front end of the document D at the sensing position of the first sensor before the lapse of a jam time for detection of the front end, if the scan controller 2 does not sense the arrival of the front end of the document D at the sensing position of a conveyance sensor 29 (here referred to as the second sensor) that has its sensing position downstream of the sensing position of the first sensor in the conveyance direction, the scan controller 2 judges that a jam has occurred. The jam time for detection of the front end is the time which is the sum of the theoretical document conveyance time from the sensing position of the first sensor to the sensing position of the second sensor and a margin time.

Moreover, after the arrival of the front end of the document D at the sensing position of a given conveyance sensor 29 before the lapse of a jam time for detection of the rear end, if the scan controller 2 does not sense the passage of the rear end of the document D (of which the leading end has reached the just-mentioned sensing position) at the same sensing position, the scan controller 2 judges that a jam has occurred. The jam time for detection of the rear end is the time which is the sum of the theoretical document conveyance time after the arrival of the front end of the document D at the sensing position of the conveyance sensor 29 until the passage of the rear end of the document D at the same sensing position and a margin time.

Blank Feeding of Documents: After the start of a feed-reading job, the scan controller 2 counts the number of sheets in the document D that have finished being read by the reading portion 220 (hereinafter occasionally referred to as read documents D). The scan controller 2 recognizes a document D discharged on the discharge tray 213 as a read document D. In other words, the scan controller 2 recognizes a document D of which the rear end has passed the reading position P2 as a read document D.

When a jam occurs during execution of a feed-reading job, the scan controller 2 suspends the feed-reading job. At this time, the scan controller 2 sets as a recovery number of sheets the number of sheets in the document D that have finished being read by the reading portion 220. That is, the scan controller 2 sets as the recovery number of sheets the number of sheets in the document D that have finished being read at the moment that the feed-reading job is suspended.

Figure 4:
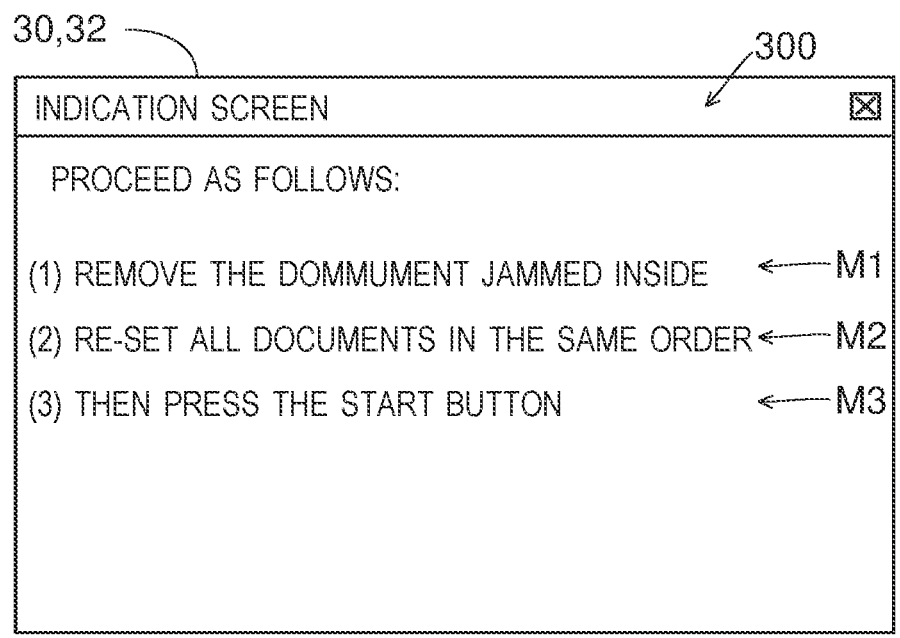
FIG. 4 is a diagram showing a notification screen displayed on an operation panel of the multifunction peripheral according to the embodiment of the present disclosure.

Moreover, when a jam occurs during execution of a feed-reading job (when the feed-reading job is suspended), the scan controller 2 makes the operation panel 30 indicate the occurrence of the jam. At this time, the operation panel 30 displays an indication screen 300 as shown in FIG. 4.

On the indication screen 300 is displayed a message M1 that prompts the user to carry out a first task of removing the document D. On the indication screen 300 is also displayed a message M2 that prompts the user to carry out a second task of re-setting in the same order all the documents D that were set on the set tray 212 at the start of the feed-reading job. The user carrying out the second task results in all the documents D—the documents D discharged on the discharge tray 213 (read documents D), the documents that remain in the conveyance passage 211 (jammed documents D), and the documents D that remain on the set tray 212—being re-set on the set tray 212 in the same order as at the start of the feed-reading job.

On the scan memory 200 is further displayed a message M3 that prompts the user to depress the Start button 31 on finishing the first and second tasks. Accordingly, after re-setting all the documents D on the set tray 212, the user depresses the Start button 31.

The scan controller 2 stores the image data acquired by reading the document D in the scan memory 200. Even when a jam occurs and a feed-reading job is suspended, the scan controller 2 does not erase the image data of read documents D. Thus, when the feed-reading job that has been suspended due to the occurrence of the jam is restarted, there is no need to read the read documents D once again.

When while the indication screen 300 is being displayed the Start button 31 is operated, the scan controller 2 restarts the feed-reading job that has been suspended due to the occurrence of the jam. That is, the operation panel 30 accepts an operation made on the Start button 31 during the display of the indication screen 300 as an instruction to restart the suspended feed-reading job. The acceptance of the instruction to restart the suspended feed-reading job (i.e., the fact of the Start button 31 being operated during the display of the indication screen 300) is conveyed from the main controller 1 to the scan controller 2.

At the time that the instruction to restart the suspended feed-reading job is accepted, regardless of whether or not the document D has finished being read, all the documents D as the reading target have been re-set on the set tray 212 in the same order as at the start of the job (when the instruction to execute the feed-reading job was initially accepted). For example, if the reading target comprises 10 sheets, even if four of them have already finished being read, the ten of the documents D are all set on the set tray 212.

On accepting the instruction to restart the suspended feed-reading job, the scan controller 2 restarts the suspended feed-reading job. First the scan controller 2 makes the document conveying unit 210 perform blank-feed processing. Blank-feed processing is processing whereby, until the number of sheets fed from the set tray 212 to the conveyance passage 211 reaches the recovery number of sheets, the documents D fed into the conveyance passage 211 are conveyed without being read. That is, during the execution of blank-feed processing, documents D are, without being read by the reading portion 220, discharged onto the discharge tray 213.

The recovery number of sheets is the number of sheets that have already been read. That is, in blank-feed processing, the read documents D are blank-fed. Thus the read documents D are not read once again.

After blank-feed processing, subsequently the scan controller 2 makes the document conveying unit 210 feed documents D from the set tray 212 to the conveyance passage 211. Then, the scan controller 2 makes the reading portion 220 perform reading starting with the document D that is fed to the conveyance passage 211 after blank-feed processing. That is, after the suspended feed-reading job is restarted, until the number of sheets fed to the conveyance passage 211 reaches the recovery number of sheets, no reading of documents D is performed. After the recovery number of sheets are fed to the conveyance passage 211, starting with the next document D that is fed to the conveyance passage 211, the reading portion 220 performs reading. In the following description, processing (conveying and reading of documents D) after blank-feed processing is occasionally referred to as ordinary processing for distinction from blank-feed processing.

If a jam occurs with a document D that is fed to the conveyance passage 211 after blank-feed processing, the indication screen 300 is displayed once again. Accordingly, as the case may be, a feed-reading job accompanied with blank-feed processing is repeated.

For example, in a feed-reading job accompanied with blank-feed processing corresponding to three documents D, the first to third documents D are blank-fed, and reading is performed starting with the forth document D that is fed. In this job, suppose a jam occurs with the tenth document D that is fed (no reading is performed with the tenth document D that is fed). In this case, at the time that the job is suspended, nine documents D have already finished being read, and thus, in the next feed-reading job accompanied with blank-feed processing, the recovery number of sheets is set at nine.

Conveyance Mode for Blank-Feed Processing: When a feed-reading job accompanied with blank-feed processing is started, that is, when a feed-reading job suspended due to occurrence of a jam is restarted, the scan controller 2 sets the conveyance mode for blank-feed processing. The conveyance mode for blank-feed processing is set to either the registration mode or the registrationless mode. The scan controller 2 makes the document conveying unit 210 perform blank-feed processing in the thus set conveyance mode.

Based on the situation before the suspension of the feed-reading job, the scan controller 2 sets the conveyance mode for blank-feed processing. As one indicator of the situation before the suspension of a feed-reading job, the scan controller 2 recognizes the conveyance mode before the suspension of the feed-reading job. As another indicator of the situation before the suspension of a feed-reading job, the scan controller 2 recognizes the number of jams, which will be described later.

Specifically, after the start of a feed-reading job, the scan controller 2 counts, as a normally conveyed number of sheets, the number of sheets in documents D that are read and discharged on the discharge tray 213 without jamming. Each time a document D finishes being read, that is, each time a document D is discharged on the discharge tray 213, the scan controller 2 increments the normally conveyed number of sheets by one.

it should be noted that, in a feed-reading job accompanied with blank-feed processing, even when a blank-fed document D is discharged on the discharge tray 213 without jamming, the normally conveyed number of sheets is not incremented. In a feed-reading job accompanied with blank-feed processing, each time the next or any later document D that is fed after blank-feed processing finishes being read, the normally conveyed number of sheets is incremented by one.

Moreover, after the start of a feed-reading job, the scan controller 2 counts the number of jams that occur in the feed-reading job. During the execution of a feed-reading job, if a jam occurs (if the feed-reading job is suspended), the scan controller 2 increments the number of jams by one. It should be noted that, in a feed-reading job accompanied with blank-feed processing, even if a jam occurs during blank-feed processing, the number of jams is not incremented.

When a feed-reading job is started, the counts of the normally conveyed number of sheets and the number of jams are both zero. When a reset condition is fulfilled, the scan controller 2 resets (makes equal to zero) the counts of the normally conveyed number of sheets and the number of jams. When the feed-reading job is complete (i.e., when all the documents D as the reading target have finished being read), the scan controller 2 judges that a reset condition is fulfilled.

Also when the normally conveyed number of sheets reaches a prescribed threshold number of sheets, the scan controller 2 judges that a reset condition is fulfilled. For example, the threshold number of sheets is two. In a case where the threshold number of sheets is two, when two successive documents D are conveyed and read normally, a reset condition is fulfilled (the number of jams is reset). Accordingly, so long as a feed-reading job is performed normally, the number of jams does not increase. Only when jams occur frequently in a single feed-reading job does the number of jams increase (to eventually reach the threshold number of jams, which will be described later).

When the conveyance mode for blank-feed processing is set, the scan controller 2 recognizes the conveyance mode and the number of jams before the suspension of the feed-reading job. Then, based on the conveyance mode and the number of jams before the suspension of the feed-reading job, the scan controller 2 sets the conveyance mode for blank-feed processing.

Figure 5:
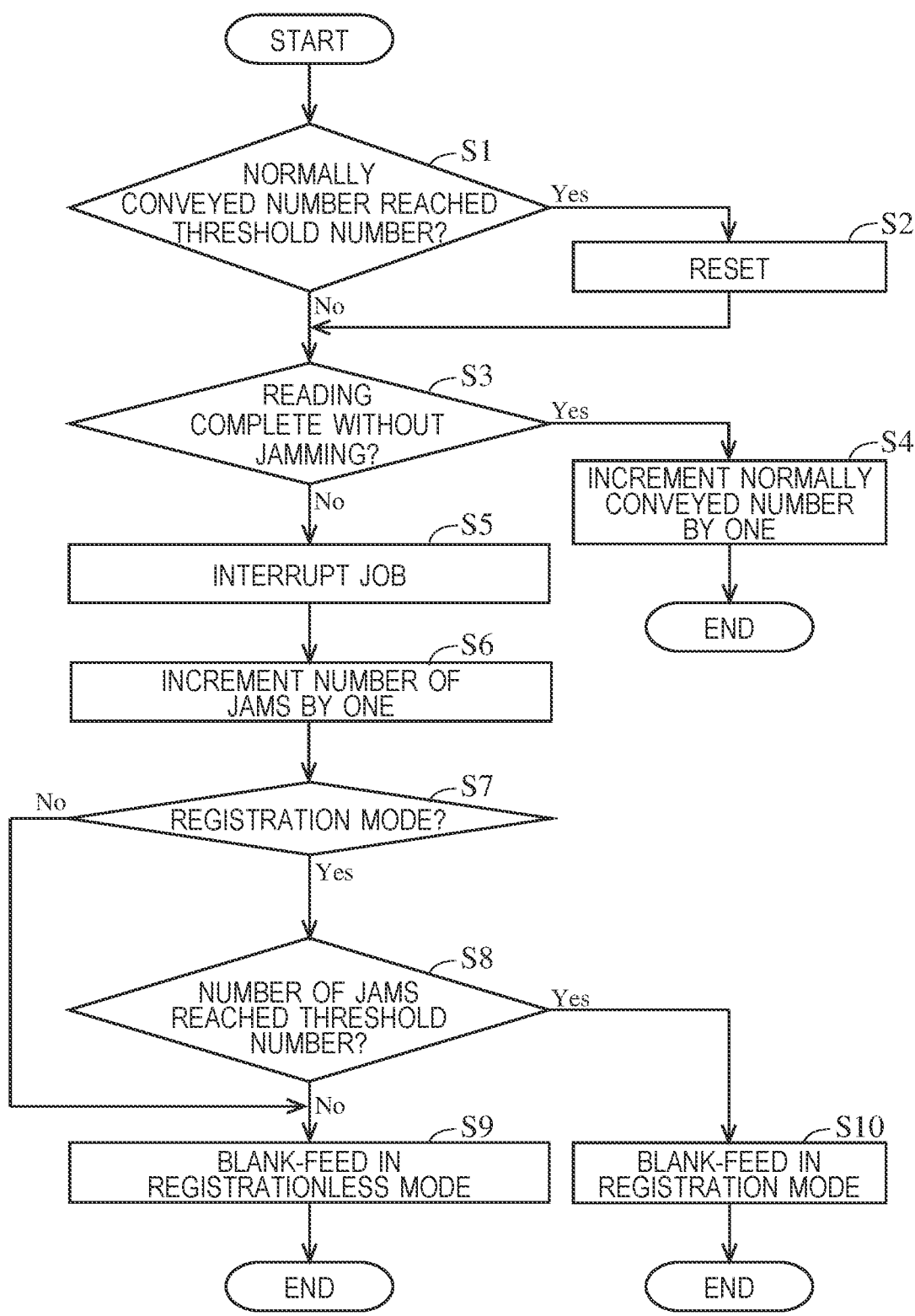
FIG. 5 is a diagram showing a procedure performed by a scan controller in the multifunction peripheral according to the embodiment of the present disclosure.

The procedure will now be described specifically with reference to the flow chart shown in FIG. 5. The procedure shown in FIG. 5 starts each time a document D that has not yet finished being read (hereinafter occasionally referred to as an unread document D) is fed from the set tray 212 to the conveyance passage 211 That is, if a document D fed to the conveyance passage 211 is a document D (read document D) as a target of blank-feed processing, the processing along the procedure shown in FIG. 5 is not performed. If a document D fed to the conveyance passage 211 is a document D (unread document D) as a target of ordinary processing, the processing along the procedure shown in FIG. 5 is performed.

At step S1, the scan controller 2 checks whether or not the current normally conveyed number of sheets has reached the prescribed threshold number of sheets. If the scan controller 2 judges that the normally conveyed number of sheets has reached the threshold number of sheets, an advance is made to step S2. If the scan controller 2 judges that the normally conveyed number of sheets has not reached the threshold number of sheets, an advance is made to step S3.

At step S2, the scan controller 2 resets the normally conveyed number of sheets and the number of jams. Then an advance is made to step S3.

For example, suppose, in a feed-reading job, an unread document D finishes being read normally without jamming with the result that the normally conveyed number of sheets becomes one and then the next unread document D jams with the result that the number of jams becomes one. Here the threshold number of sheets is assumed to be two.

Then, for example, if in the first feed-reading job accompanied with blank-feed processing thereafter the first unread document D after blank-feed processing finishes being read normally without jamming, while the number of jams remains one, the normally conveyed number of sheets becomes two. Accordingly, in this example, when the second unread document D after blank-teed processing is fed, the normally conveyed number of sheets and the number of jams are both reset.

For another example, if in the first feed-reading job accompanied with blank-feed processing thereafter the first unread document D after blank-feed processing jams, while the normally conveyed number of sheets remains one, the number of jams becomes two. Accordingly, in the next feed-reading job accompanied with blank-feed processing, when the first unread document D after blank-feed processing is fed, the normally conveyed number of sheets has not reached the threshold number of sheets; thus the normally conveyed number of sheets (one) is not reset, nor is the number of jams (two) reset.

Thus, when jams occur frequently (successively), the number of jams increases; in contrast, if jams do not occur frequently, the number of jams does not increase. This is because, even if jams occur occasionally, the number of jams is reset shortly.

At step S3, the scan controller 2 checks whether or not the unread document D just fed has finished being read normally without jamming. If the scan controller 2 judges that it has, an advance is made to step S4. If the scan controller 2 judges otherwise (that a jam has occurred), an advance is made to step S5.

At step S4, the scan controller 2 increments the normally conveyed number of sheets by one, and the procedure ends. If there remains any unread document D on the set tray 212, the procedure shown in FIG. 5 starts.

At step S5 (if a jam occurs), the scan controller 2 suspends the teed-reading job. Then, at step S6, the scan controller 2 increments the number of jams by one.

At step S7, the scan controller 2 recognizes the conveyance mode before the suspension of the current feed-reading job (i.e., the conveyance mode for ordinary processing). In other words, the scan controller 2 recognizes the conveyance mode as it was when the current feed-reading job was started. In yet other words, the scan controller 2 recognizes the conveyance mode set based on the type of the documents D as the reading target of the current feed-reading job.

Then the scan controller 2 checks whether or not the conveyance mode before the suspension of the current feed-reading job was the registration mode. In other words, the scan controller 2 checks whether or not the current feed-reading job was started in the registration mode. If the scan controller 2 judges that the conveyance mode before the suspension of the current feed-reading mode was the registration mode (the current feed-reading mode was started in the registration mode), an advance is made to step S8.

At step S8, the scan controller 2 checks whether or not the number of jams has reached a prescribed threshold number of jams. If the scan controller 2 judges that the number of jams has not reached the threshold number of jams, an advance is made to step S9. If the scan controller 2 judges that that the number of jams has reached the threshold number of jams, an advance is made to step S10.

At step S9, when the suspended feed-reading job is restarted (when a feed-reading job accompanied with blank-feed processing is started), the scan controller 2 sets the conveyance mode for blank-feed processing to the registrationless mode. That is, in the feed-reading job accompanied with blank-feed processing that is started subsequently, the scan controller 2 makes the document conveying unit 210 convey a read document D (blank-feed processing) in the registrationless mode.

If at step S7 the scan controller 2 judges that the conveyance mode before the suspension of the current feed-reading job was the registrationless mode (the current feed-reading job was started in the registrationless mode), step S8 is skipped and an advance is made to step S9. That is, if the conveyance mode before the suspension of the current feed-reading job was the registrationless mode, in the feed-reading job restarted subsequently, blank-feed processing is performed in the registrationless mode.

At step S10, when the suspended feed-reading job is restarted (when a feed-reading job accompanied with blank-feed processing is started), the scan controller 2 sets the conveyance mode for blank-feed processing to the registration mode. That is, in the subsequently started feed-reading job accompanied with blank-feed processing, the scan controller 2 makes the document conveying unit 210 convey read documents D (blank-feed processing) in the registration mode.

It should be noted that, for ordinary processing (conveyance of an unread document D) after blank-feed processing, the scan controller 2 has it performed in the conveyance mode recognized at step S7. That is, it can occur that, while conveyance of a read document D (blank-feed processing) is performed in the registrationless mode, conveyance of an unread document D is performed in the registration mode. It can also occur that conveyance of both a read document D and an unread document D is performed in the registration mode. It can also occur that occurrence of both a read document D and an unread document D is performed in the registrationless mode.

In the embodiment, as described above, after a feed-reading job is suspended due to occurrence of a jam, when the suspended feed-reading job is restarted (when a feed-reading job accompanied with blank-feed processing is started), the scan controller 2 checks whether or not the conveyance mode before the suspension of the feed-reading job was the registration mode and, if the conveyance mode before the suspension of the feed-reading job was the registration mode, the scan controller 2 recognizes the number of jams that occurred in the feed-reading job.

Here, the fact that the conveyance mode before the suspension of the feed-reading mode (i.e., the conveyance mode for ordinary processing) was the registration mode indicates that it has been predicted that conveying a document D as the reading target in the registrationless mode will make jams likely to occur. Accordingly, in the feed-reading job about to be restarted, to reliably suppress occurrence of a jam during blank-feed processing, it is preferable to perform blank-feed processing in the registration mode. However, performing blank-feed processing in the registration mode takes a longer processing time than performing it in the registrationless mode. That is, a feed-reading job takes a longer time to be completed.

Thus, when a feed-reading job suspended due to occurrence of a jam is restarted, the scan controller 2 sets the conveyance mode for blank-feed processing. In other words, even if the conveyance mode before the suspension of the feed-reading job was the registration mode, it does not necessarily follow that, in the restarted feed-reading job, blank-feed processing is performed in the registration mode.

Specifically, suppose, in a case where the conveyance mode before the suspension of a feed-reading job was the registration mode, the number of jams was low. In such a case, even if the conveyance mode before the suspension of the feed-reading mode had been the registrationless mode, the number of jams might haven been low.

On the other hand, suppose, in a case where the conveyance mode before the suspension of a feed-reading job was the registration mode, the number of jams was high. Here, jams are more likely to occur in the registrationless mode than in the registration mode. Accordingly, in such a case, performing blank-feed processing in the registrationless mode is likely to cause a jam.

Out of those considerations, if the conveyance mode before the suspension of a feed-reading mode was the registration mode and in addition the number of jams has not reached the prescribed threshold number of jams, the scan controller 2 has blank-feed processing performed in the registrationless mode. On the other hand, if the conveyance mode before the suspension of a feed-reading mode was the registration mode and in addition the number of jams has reached the prescribed threshold number of jams, the scan controller 2 has blank-feed processing performed in the registration mode.

As described above, in the embodiment, blank-feed processing is performed in one of the registration mode and the registrationless mode. Neither of these conveyance modes is one in which the conveyance speed is made higher than in ordinary processing. In other words, the conveyance speed during blank-feed processing is equal to that during ordinary processing. This helps suppress occurrence of jams during execution of blank-feed processing.

If the conveyance mode before the suspension of a feed-reading mode was the registration mode and in addition the number of jams has not reached the prescribed threshold number of jams, blank-feed processing is performed in the registrationless mode. Whereas in the registration mode the traveling of a document D is momentarily stopped, in the registrationless mode the traveling of a document D is not stopped. Accordingly, in a case where the conveyance mode for blank-feed processing is the registrationless mode, blank-feed processing ends quickly. It is thus possible to reduce the time required for blank-feed processing while suppressing occurrence of jams during blank-feed processing.

Moreover, in the embodiment, as described above, when the normally conveyed number of sheets reaches the prescribed threshold number of sheets, the scan controller 2 resets the normally conveyed number of sheets and resets the number of jams as well. With this configuration, if jams do not occur frequently (in a situation where jams are unlikely to occur), the number of jams is reset. It is thus possible to suppress the inconvenience of blank-feed processing being performed in the registration mode despite jams not occurring frequently.

Moreover, in the embodiment, as described above, if the conveyance mode before the suspension of a feed-reading job was the registrationless mode, the scan controller 2 has blank-feed processing performed in the registrationless mode. Here the fact that the conveyance mode before the suspension of a feed-reading job was the registrationless mode indicates that it has been predicted that conveying a document D as the reading target in the registrationless mode will not make jams likely to occur. Accordingly, if the conveyance mode before the suspension of a feed-reading job was the registrationless mode, it is preferable to perform blank-feed processing in the registrationless mode.

Moreover, in the embodiment, as described above, based on the type of the document D set on the set tray 212, the scan controller 2 determines whether to perform a feed-reading job (ordinary processing) in the registration mode or in the registrationless mode. In other words, based on the result of prediction processing, the scan controller 2 determines whether to perform a feed-reading job (ordinary processing) in the registration mode or in the registrationless mode.

With this configuration, in response to a prediction that conveying the document D set on the set tray 212 in the registrationless mode will make jams likely to occur, the feed-reading job (ordinary processing) is performed in the registration mode. It is thus possible to suppress occurrence of jams during ordinary processing.

On the other hand, in response to a prediction that conveying the document D set on the set tray 212 in the registrationless mode will not make jams likely to occur, a feed-reading job (ordinary processing) is performed in the registrationless mode, it is thus possible to reduce the time required by ordinary processing while suppressing occurrence of jams during ordinary processing.

It should be understood that the embodiments disclosed herein are in every aspect illustrative and not restrictive. The scope of the present disclosure is defined not by the description of embodiments given above but by the appended claims, and encompasses any modifications made within a scope and sense equivalent to the appended claims.

What is claimed is:
1. An image reading apparatus comprising:
a conveying portion having a conveyance passage leading from a setting portion via a registration position and a reading position to a discharge portion, during execution of a job the conveying portion feeding a sheet set on the setting portion to the conveyance passage, then conveying the sheet, and then discharging the sheet to the discharge portion;
a reading portion which during execution of the job reads at the reading position the sheet being conveyed along the conveyance passage; and
a controller which controls the job,
wherein
the conveying portion has, as sheet conveyance modes,
a registration mode in which the conveying portion performs skew correction for the sheet at the registration position and a registrationless mode in which the conveying portion does not perform the skew correction, when a jam occurs during execution of the job,
the controller interrupts the job,
the controller sets as a recovery number of sheets a number of sheets that have finished being read by the reading portion,
the controller makes the conveying portion perform blank-feed processing to discharge a sheet fed to the conveyance passage to the discharge portion without reading the sheet starting from a state where all sheets that were set on the setting portion at a start of the job have been re-set on the setting portion until a number of sheets that have fed from the setting portion to the conveyance passage reaches the recovery number of sheets, and
the controller makes the reading portion read a sheet starting with a next sheet that is fed to the conveyance passage after feeding of a number of sheets corresponding to the recovery number of sheets to the conveyance passage,
when making the conveying portion perform the blank-feed processing, the controller checks whether or not the conveyance mode before interruption of the job was the registration mode and if the conveyance mode before interruption of the job was the registration mode, the controller recognizes a number of jams that have occurred in the job, and
if the conveyance mode before interruption of the job was the registration mode and in addition the number of jams has not reached a prescribed threshold number of jams, the controller makes the conveying portion perform the blank-feed processing in the registrationless mode.

2. The image reading apparatus according to claim 1, wherein
if the conveyance mode before interruption of the job was the registration mode and in addition the number of jams has reached the prescribed threshold number of jams, the controller makes the conveying portion perform the blank-feed processing in the registration mode.

3. The image reading apparatus according to claim 1, wherein
during execution of the job the controller counts, as a normally conveyed number of sheets, a number of sheets that have finished being read and been discharged without jamming, and
when the normally conveyed number of sheets reaches a prescribed threshold number of sheets, the controller resets the normally conveyed number of sheets and resets the number of jams.

4. The image reading apparatus according to claim 1, wherein
if the conveyance mode before interruption of the job was the registrationless mode, the controller makes the conveying portion perform the blank-feed processing in the registrationless mode.

5. The image reading apparatus according to claim 1, further comprising:
an accepting portion that accepts choice of a type of sheets set on the setting portion,
wherein
when starting the job, based on the type of the sheets set on the setting portion, the controller determines whether to execute the job in the registration mode or in the registrationless mode.

6. An image forming apparatus comprising the image reading apparatus according to claim 1.

7. A method of controlling an image reading apparatus, the image reading apparatus
having a conveyance passage leading from a setting portion via a registration position and a reading position to a discharge portion,
during execution of a job, feeding a sheet set on the setting portion to the conveyance passage and then conveying the sheet,
reading at the reading position the sheet being conveyed along the conveyance passage, and
discharging the sheet to the discharge portion,
sheet conveyance modes including a registration mode in which skew correction for the sheet is performed at the registration position and a registrationless mode in which the skew correction is not performed,
the method comprising:
when a jam occurs during execution of the job,
interrupting the job,
setting as a recovery number of sheets a number of sheets that have finished being read by the reading portion,
performing blank-feed processing to discharge a sheet fed to the conveyance passage to the discharge portion without reading the sheet starting from a state where all sheets that were set on the setting portion at a start of the job have been re-set on the setting portion until a number of sheets that have fed from the setting portion to the conveyance passage reaches the recovery number of sheets, and
reading a sheet starting with a next sheet that is fed to the conveyance passage after feeding of a number of sheets corresponding to the recovery number of sheets to the conveyance passage;
when performing the blank-feed processing, checking whether or not the conveyance mode before interruption of the job was the registration mode and if the conveyance mode before interruption of the job was the registration mode, recognizing a number of jams that have occurred in the job; and
if the conveyance mode before interruption of the job was the registration mode and in addition the number of jams has not reached a prescribed threshold number of jams, performing the blank-feed processing in the registrationless mode.

8. An image reading apparatus, comprising:
a conveying portion having a conveyance passage leading from a setting portion via a registration position and a reading position to a discharge portion, during execution of a job the conveying portion feeding a sheet set on the setting portion to the conveyance passage, then conveying the sheet, and then discharging the sheet to the discharge portion;
a reading portion which during execution of the job reads at the reading position the sheet being conveyed along the conveyance passage; and
a controller which controls the job,
wherein
the conveying portion has as sheet conveyance modes,
a registration mode in which the conveying portion momentarily stops the sheet at the registration position and
a registrationless mode in which the conveying portion does not momentarily stop the sheet,
when a jam occurs during execution of the job,
the controller interrupts the job, the controller sets as a recovery number of sheets a number of sheets that have finished being read by the reading portion, the controller makes the conveying portion perform blank-feed processing to discharge a sheet ted to the conveyance passage to the discharge portion without reading the sheet starting from a state where all sheets that were set on the setting portion at a start of the job have been re-set on the setting portion until a number of sheets that have fed from the setting portion to the conveyance passage reaches the recovery number of sheets, and when making the conveying portion perform the blank-feed processing, the controller makes the conveying portion perform the blank-feed processing in the registrationless mode.

\* \* \* \* \*